3,549,644
2,3,4,4a,5,6,8,9,13b,13c - DECAHYDRO-1H-DIBENZO [a,h]QUINOLIZINES AND PROCESS FOR THEIR PRODUCTION
John Shavel, Jr., Mendham, and Glenn Morrison, Dover, N.J., assignors to Warner-Lambert Pharmaceutical Company, Morris Plains, N.J., a corporation of Delaware
No Drawing. Filed Dec. 19, 1967, Ser. No. 691,702
Int. Cl. C07d 39/00
U.S. Cl. 260—289                    9 Claims

ABSTRACT OF THE DISCLOSURE

The condensation of 2-formylcyclohexaneacetic acid with 3,4-dialkoxy-phenethylamine led first to the unsaturated lactam (1)

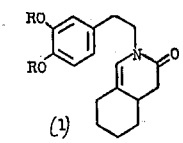

and then to the three isomeric saturated lactams (2), (3) and (4).

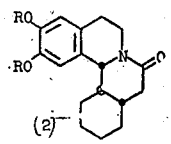 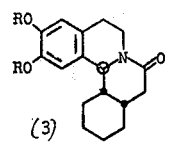 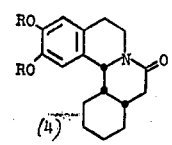

The lactams could be reduced to the corresponding bases (5), (6) and (7).

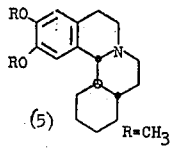 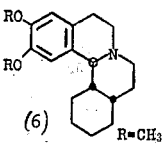 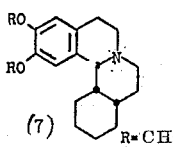

The methoxy groups were hydrolyzed to give the corresponding diphenols (8), (9) and (10).

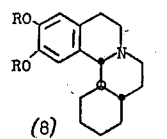 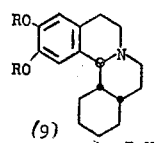 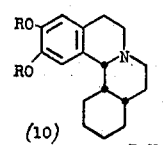

The lactam (1)

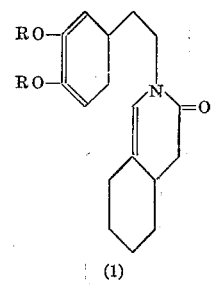

is reduced to an octahydroisoquinoline and cyclized to the base (11).

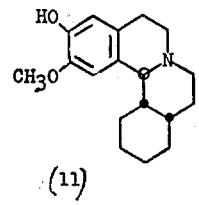

This invention relates to a new class of heterocyclic compounds and more particularly, this invention relates to 2,3,4,4a,5,6,8,9,13b,13c - decahydro-1H-dibenzo[a,h] quinolizines having the formula:

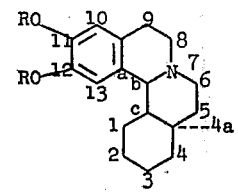

wherein R represents hydrogen or lower alkyl alkyl of 1 to 6 carbon atoms, such as methyl, ethyl, propyl, isopropyl, butyl, isobutyl, hexyl and the like.

Also embraced within the scope of this invention are the non-toxic pharmaceutically acceptable acid addition salts of the above described bases, and their quaternary ammonium salts and N-oxides.

The symbol R as used hereinafter has the meaning as defined above.

In the following description, cis-trans refers to hydrogens at 4a and 13c, and syn-anti refers to hydrogens at 13b and 13c.

This invention also includes within its scope a new and novel process for the preparation of the above compounds, as well as the intermediates employed for their synthesis.

The compounds of this invention exhibit analgesic activity in a mammalian host. They are useful for the symptomatic relief of pain in mammals such as dogs, cats, mice and the like. The oral $LD_{50}$ in mice is between about 200 mg./kg. to 1000 mg./kg. In order to use these compounds as analgesics, they are combined with inert pharmaceutical carrier materials, such as lactose, mannitol, dicalcium phosphate and the like, to form dosage forms such as capsules, tablets, powders and the like. They may also be combined with parenterally acceptable liquid vehicles, such as water, to form dosage forms suitable for parenteral injection.

Generally speaking, to a mammalian host weighing about 70 kg., afflicted with pain, a dose of about 25 to 500 mg. several times daily is administered to produce the desired analgesic activity. This dosage regimen can be varied according to individual variations in body weight, age, sex, or the species of the mammal being treated and according to the severity of pain. This dosage adjustment is to be made according to methods well known to the healing arts.

According to the process of this invention, the above compounds are prepared by reacting formlycyclohexane-acetic acid with 3,4-alkoxyphenethylamine to give an unsaturated lactam of the Formula 1.

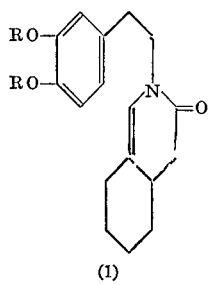

(1)

The reaction is carried out by heating the starting materials in an acidic medium, such as acetic acid, at the reflux temperature medium employed over a short period of time, such as from one to two hours. On longer heating, such as from two to twenty-four hours, there is obtained a mixture of the three saturated lactams having the Formulas 2, 3 and 4 below:

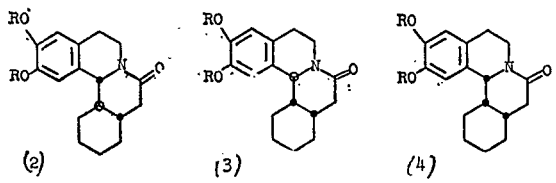

(2) (3) (4)

These saturated lactams, (2), (3), and (4), can be reduced to the corresponding bases (5), (6), and (7):

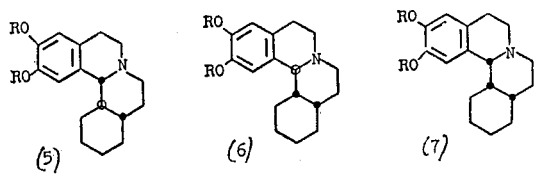

(5) (6) (7)

with an alkali metal hydride, such as lithium aluminum hydride. The ethers (5), (6) and (7) can be converted to the corresponding phenols by acidic hydrolysis with an agent such as hydrobromic acid.

The carbonyl function of the lactam can be reduced by an alkali metal hydride to give an octahydroisoquinoline 10 which can be cyclized with an acid such as refluxing 20% hydrochloric acid to give the monohydroxy derivative of the cis-anti base of the Formula 11. This reaction may be represented by the following equation.

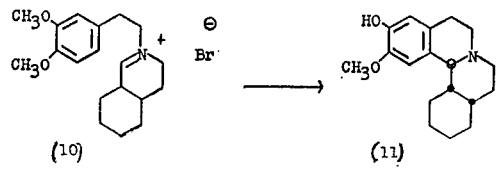

(10) (11)

The oxidation of the base (5) with mercuric acetate at an elevated temperature such as from 60 to 100° C. affords the dehydro derivative (13) which on reduction with a noble metal catalyst gives both the cis-syn (7) and trans-anti (5) isomers.

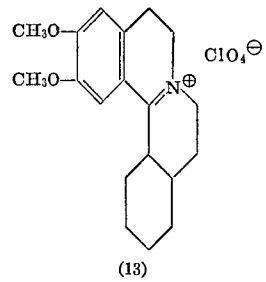

(13)

The compounds of our invention may be converted into their pharmaceutically acceptable non-toxic acid addition and quaternary ammonium salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate.

The N-oxides are prepared by treating the free base with hydrogen peroxide.

The following examples are included in order further to illustrate the invention.

EXAMPLE 1

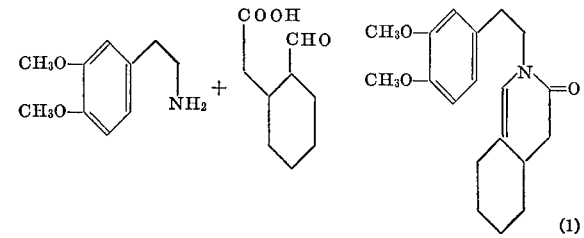

(1)

2 - (3,4 - dimethoxyphenethyl) - 4,4a,5,6,7,8 - hexahydro-3(2H)-isoquinolone.—A solution of 67 g. of homoveratrylamine and 63 g. of 2-formycyclohexaneacetic acid in 440 ml. of acetic acid was refluxed for 2.5 hrs. The acetic acid was removed in vacuo. The residue was treated with 200 ml. of 10% sodium hydroxide solution and 1.5 l. of methylene chloride. The methylene chloride layer was washed with water, dried over sodium sulfate, and the solvent was removed. The residue was digested with 400 ml. of ethyl acetate and allowed to cool. The mixture was filtered and the ethyl acetate solution evaporated to dryness. The residue was chromatographed on 2.5 kg. of alumina. Elution with benzene-methylene chloride 1:1 gave after recrystallization from Skellysolve B 18.1 g. (28% of 2-(3,4 - dimethoxyphenethyl)-4,4a,5,6, 7,8 - hexahydro - 3(2H) - isoquinolone as a crystalline solid, M.P. 90–91°.

Analysis.—Calcd. for $C_{19}H_{25}NO_3$ (percent): C, 72.35; H, 7.99; N, 4.44. Found (percent): C, 72.63; H, 8.07; N, 4.47.

EXAMPLE 2

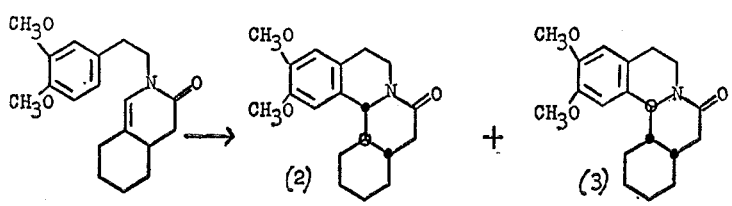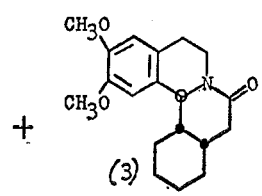

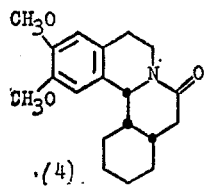

Trans-anti, cis-anti and cis-syn-1,2,3,4,4a,5,8,9,13b,13c-decahydro-11,12-dimethoxy-6Hdibenzo[a,h,]quinolizin-6-ones(2,3 and 4).—A solution of 163 g. of homoveratrylamine and 162 g. of 2-formylcyclohexaneacetic acid in 1.1 l. of acetic was refluxed for 24 hrs. The acetic acid was removed in vacuo. The residue was treated with 1 l. of 10% sodium carbonate solution and 2.7 l. of methylene chloride. The methylene chloride layer was washed with water, dried with sodium sulfate, and the solvent was removed. The residue, after crystallization from 3.8 l. of ethyl acetate afforded 158 g. (56%) of a solid, M.P. 166–168°. Recrystallization from ethyl acetate gave an analytical sample of the trans-anti isomer (2) M.P. 169–170°.

Analysis.—Calcd. for $C_{19}H_{25}NO_3$ (percent): C, 72.35; H, 7.99; N, 4.44. Found (percent): C, 72.58; H, 8.03; N, 4.71.

Concentration of the mother liquor to 600 ml. gave a second crop, 104 g., M.P. 134–140°, which was chromatographed on 4.0 kg. of alumina. Elution of the column with methylene chloride gave, after recrystallization from Skellysolve B, 18 g. (6%) of the cis-anti isomer (3) M.P. 145–146°.

Analysis.—Calcd. for $C_{19}H_{25}NO_3$ (percent): C, 72.35; H, 7.99; N, 4.44. Found (percent): C, 72.45; H, 7.94; N, 4.49.

The mother liquor from the crystallization was evaporated to dryness and the residue was chromatographed on 1.2 g. of alumina. Elution with benzene methylene chloride 1:1 gave after recrystallization from ethyl acetate 0.05 g. (0.02%) of the cis-syn isomer (4) M.P. 150–153°.

EXAMPLE 3

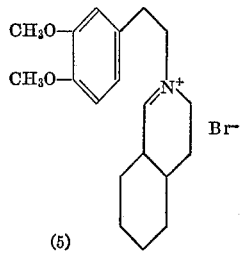

2-(3,4 - dimethoxyphenethyl) - 3,4,4a,5,6,7,8,8a-octahydroisoquinolinium bromide.—To a solution of 10.2 g. of lithium aluminum hydride in 800 ml. of ether was added a solution of 17.85 g. of 2 - (3,4 - dimethoxyphenethyl) - 4,4a,5,6,7,8 - hexahydro-3(2H)-isoquinolone in 1.4 l. of ether. The solution was refluxed for 3 hrs. and allowed to stand for 20 hrs. The excess hydride was destroyed by the dropwise addition of water and the mixture was filtered. On acidification of the ethereal solution with hydrogen bromide there was deposited a solid which after recrystallization from acetonitrile afforded 9.3 g. (43%) of 2-(3,4-dimethoxyphenethyl) - 3,4,4a,5, 6,7,8,8a - octahydroisoquinolinium bromide as a solid, M.P. 190.5–192°. Further recrystallization gave an analytical sample, M.P. 193–194°.

Analysis.—Calcd. for $C_{19}H_{28}NO_2Br$ (percent): C, 59.69; H, 7.38; N, 3.66. Found (percent): C, 59.63; H, 7.26; N, 3.94.

EXAMPLE 4

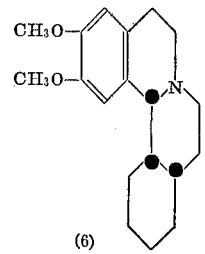

Cis-syn - 2,3,4,4a,5,6,8,9,13b,13c - decahydro - 11,12-dimethoxy - 1H-dibenzo [a,h,]quinolizine.—Reduction of 30 mg. of cis-syn - 1,2,3,4,4a,5,8,9,13b,13c-decahydro-11,12 - dimethoxy - 6Hdibenzo[a,h]quinolizin-6-one by the procedure used for the trans-anti isomer gave a solid. This layer chromatography on silica gel using a 1:1 benzene:ethyl acetate system in an ammonia atmosphere showed that this sample was identical to that obtained from the reduction of 1,2,3,4,4a,5,6,8,9,13c - decahydro-11,12 - dimethoxydibenzo[a,h,]quinolizinium perchlorate.

EXAMPLE 5

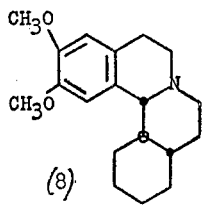

Trans-anti - 2,3,4,4a,5,6,8,9,13b,13c - decahydro - 11, 12 - dimethoxy - 1H - dibenzo[a,h]quinolizine.—To a solution of 18 g. of lithium aluminum hydride in 750 ml. of tetrahydrofuran was added a solution of 110 g. of trans-anti - 1,2,3,4,4a,5,8,9,13b,13c - decahydro - 11,12-dimethoxy - 6H - dibenzo[a,h]quinolizin-6-one in 2.4 l. of tetrahydrofuran and the resulting solution refluxed for 5 hrs. The excess hydride was destroyed by the dropwise addition of water and the mixture was filtered. The tetrahydrofuran solution was stripped to dryness. Recrystallization of the residue from Skellysolve B gave 91 g. (86%) of a solid, M.P. 100–101°.

Analysis.—Calcd. for $C_{19}H_{27}NO_2$ (percent): C, 75.71; H, 9.03; N, 4.65. Found (percent): C, 75.96; H, 9.06; N, 4.57.

EXAMPLE 6

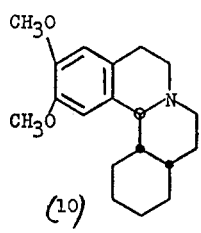

(10)

Cis - anti - 2,3,4,4a,5,6,8,9,13b,13c - decahydro - 11,12 - dimethoxy-1H-dibenzo [a,h]quinolizine.—Reduction of 9.9 g. of cis - anti - 1,2,3,4,4a,5,8,9,13b,13c - decahydro-11, 12 - dimethoxy - 6H - dibenzo[a,h]quinolizin-6-one by the procedure used for the trans isomer gave after recrystallization from Skellysolve B 6.9 g. (75%) of a solid, M.P. 117.5–118°. Further recrystallization gave an analytical sample, M.P. 118–119°.

Analysis.—Calcd. for $C_{19}H_{27}NO_2$ (percent): C, 75.71; H, 9.03; N, 4.65. Found (percent): C, 75.82; H, 9.11; N, 4.57.

EXAMPLE 7

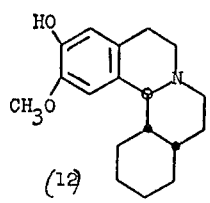

(12)

Cis - anti - 2,3,4,4a,5,6,8,9,13b,13c - decahydro - 11 - hydroxy - 12 - methoxy - 1H - dibenzo[a,h]quinolizine.— A solution of 6.5 g. of 2-(3,4-dimethoxyphenethyl)-3,4, 4a,5,6,7,8,8a-octahydroisoquinolinium bromide in 6 N hydrochloric acid was refluxed for 6 hrs. The pH of the reaction mixture was adjusted to 9 with 40% sodium solution, and the mixture was extracted with ether. The ethereal solution was washed with water, dried over sodium sulfate and the solvent was removed. Crystallization of the residue from benzene gave 0.6 g. of cis - anti - 2,3,4, 4a,5,6,8,9,13b,13c - decahydro - 11 - hydroxy - 12 - methoxy-1H-dibenzo[a,h]quinolizine as a solid, M.P. 134–135°.

Analysis.—Calcd. for $C_{19}H_{27}NO_2$ (percent): C, 75.71; H, 9.03; N, 4.65. Found (percent): C, 75.42; H, 8.91; N, 3.97.

EXAMPLE 8

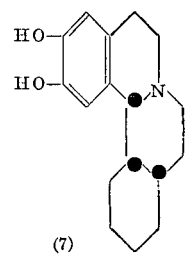

(7)

Cis - syn - 2,3,4,4a,5,6,8,9,13b,13c - decahydro - 11,12-dihydroxy-1H-dibenzo[a,h]quinolizine hydrobromide.—A solution of 7.0 g. of cis - syn - 2,3,4,4a,5,6,8,9,13b,13c - decahydro - 11,12 - dimethoxy - 1H - dibenzo[a,h]quinolizine in 175 ml. of hydrobromic acid was refluxed for 8 hrs. On standing there was deposited a solid which on recrystallization from ethanol afforded 6.9 g. (84%) of cis-syn-2,3,4,4a,5,6,8,9,13b,13c-decahydro - 11,12 - dihydroxy-1H - dibenzo[a,h]quinolizine hydrobromide as a solid, M.P. 327–329°.

Analysis.—Calcd. for $C_{17}H_{24}BrN_2O$ (percent): C, 57.63; H, 6.83; N, 3.95. Found (percent): C, 57.43; H, 6.76; N, 3.97.

EXAMPLE 9

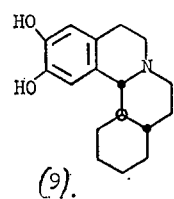

(9)

Trans - anti - 2,3,4,4a,5,6,8,9,13b,13c - decahydro - 11, 12 - dihydroxy - 1H - dibenzo[a,h]quinolizine.—A solution of 2.0 g. of trans - anti - 2,3,4,4a,5,6,8,9,13b,13c - decahydro - 11,12 - dimethoxy - 1H - dibenzo[a,h]quinolizine in 55 ml. of hydrobromic acid was refluxed for 6 hrs. in a nitrogen atmosphere. The reaction mixture was neutralized to pH 8.5 with dilute ammonium hydroxide and extracted with methylene chloride. The methylene chloride layer was washed with water, dried over sodium sulfate, and the solvent was removed. Recrystallization of the residue from ethyl acetate gave 0.92 g. (50%) of trans - anti - 2,3,4,4a,5,6,8,9,13b,13c - decahydro - 11,12-dihydroxy-1H-dibenzo[a,h]quinolizine as a solid, M.P. 221–222°.

Analysis.—Calcd. for $C_{17}H_{23}NO_2$ (percent): C, 74.69; H, 8.48; N, 5.12. Found (percent): C, 74.62; H, 8.53; N, 4.97.

EXAMPLE 10

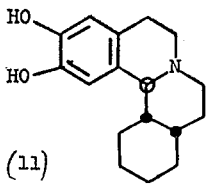

(11)

Cis - anti - 2,3,4,4a,5,6,8,9,13b,13c - decahydro - 11,12-dihydroxy - 1H-dibenzo[a,h]quinolizine hydrobromide.—
Method A: A solution of 8.0 g. of cis-anti-2,3,4,4a,5,6,8, 9,13b,13c - decahydro - 11,12 - dimethoxy - 1H - dibenzo [a,h]quinolizine in 200 ml. of hydrobromic acid was refluxed for 6 hrs. On standing, there was deposited a solid which after recrystallization from ethanol afforded 7.4 g. (79%) of cis - anti - 2,3,4,4a,5,6,8,9,13b,13c - decahydro-11,12 - dihydroxy - 1H - dibenzo[a,h]quinolizine hydrobromide as a solid, M.P. 286–288°.

Analysis.—Calcd. for $C_{17}H_{24}BrNO_2$ (percent): C, 57.63; H, 6.83; N, 3.95. Found (percent): C, 57.52; H, 6.89; N. 3.94.

Method B: A solution of 0.10 g. of cis-anti-2,3,4,4a,5, 6,8,9,13b,13c - decahydro - 11 - hydroxy - 12 - methoxy-1H-dibenzo[a,h]quinolizine in 15 ml. of hydrobromic acid was refluxed for 6 hrs. On standing, there was deposited 0.11 g. of a crystalline solid M.P. 286–288°. This sample was shown to be identical to that obtained in method A by the method of mixture melting point.

EXAMPLE 11

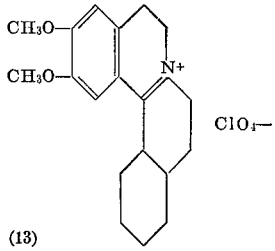

(13)

1,2,3,4,4a,5,6,8,9,13c - decahydro - 11,12 - dimethoxy-dibenzo[a,h]quinolizinium perchlorate.—To a solution of 50 g. of trans-anti-2,3,4,4a,5,6,8,9,13b,13c-decahydro-11, 12-dimethoxy-1H-dibenzo[a,h]quinolizine in 1 liter of 5% acetic acid was added a solution of 530 g. of mercuric acetate in 1.5 liter of 5% acetic acid. After the addition had been completed the solution was heated at 95° for 3 hours with stirring. The hot reaction mixture was saturated with hydrogen sulfide and filtered. Treatment of the filtrate with perchloric acid gave after recrystallization from methanol, 44 g. (66%) of a solid, M.P. 178–180°. Further recrystallization gave an analytical sample, M.P. 185–186°.

*Analysis.*—Calcd. for $C_{19}H_{26}ClNO_6$ (percent): C, 57.07; H, 6.55; N, 3.50. Found (percent): C, 56.83; H, 6.56; N, 3.78.

EXAMPLE 12

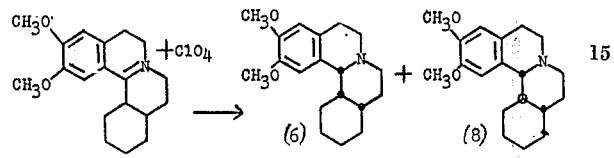

Reduction of 1,2,3,4,4a,5,6,8,9,13c - decahydro - 11, 12 - dimethoxy - dibenzo[a,h]quinolizine perchlorate.— *Method A:* To a solution of 30 g. of 1,2,3,4,4a,5,6,8,9, 13c - decahydro - 11,12 - dimethoxydibenzo[a,h]quinolizinium perchlorate in 60 ml. of water and 800 ml. of ethanol was added 3.0 g. of platinum oxide and the mixture was hydrogenated. Uptake creased after the theoretical amount of hydrogen had been absorbed. The catalyst was removed by filtration. After removal of the solvent the residue was treated with 300 ml. of 10% sodium hydroxide solution and 2.3 l. of ether. The ether layer was washed with water, dried over sodium sulfate and the solvent was removed. The residue was chromatographed on 600 g. of alumina. Elution of the column with benzene gave 6.0 g. (27%) of cis-syn-2,3,4,4a,5,6,8,9,13b,13c-decahydro - 11,12 - dimethoxy - 1H - dibenzo[a,h]quinolizine, M.P. 119–121°. Recrystallization from Skellysolve B gave analytical sample, M.P. 121–122°.

*Analysis.*—Calcd. for $C_{19}H_{27}NO_2$ (percent): C, 75.71; H, 9.03; N, 4.65. Found (percent): C, 75.70; H, 9.01; N, 4.73.

Elution of the column with chloroform-methanol gave 5.4 g. of material which contained mostly trans-anti-2,3, 4,4a,5,6,8,9,13b,13c - decahydro - 11,12 - dimethoxy-1H-dibenzo[a,h]quinolizine as shown by this layer chromatography.

It is understood that the foregoing detailed description is given merely by way of illustration and that many variations may be made therein without departing from the spirit of our invention.

Having described our invention, what we desire to secure by Letters Patent is:

1. A free base of the formula:

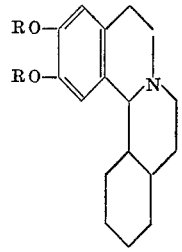

wherein R is hydrogen or lower alkyl or its non-toxic pharmaceutically acceptable acid addition salts or its quaternary ammonium salts or its N-oxides.

2. The compound of claim 1 having the formula:

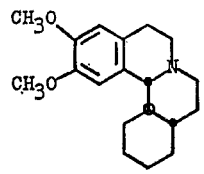

or its non-toxic pharmaceutically acceptable acid addition salts or its quaternary ammonium salts or its N-oxides.

3. The compound of claim 1 having the formula:

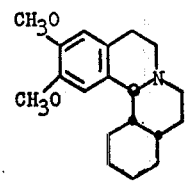

4. The compound of claim 1 having the formula:

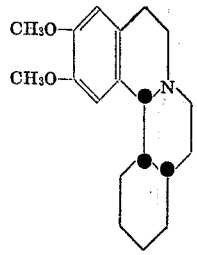

5. The compound of claim 1 having the formula:

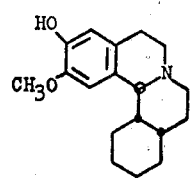

6. The compound of claim 1 having the formula:

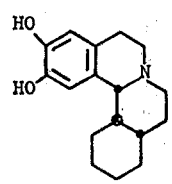

7. The compound of claim 1 having the formula:

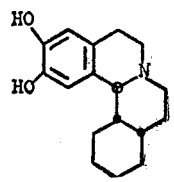

8. The compound of claim 1 having the formula:

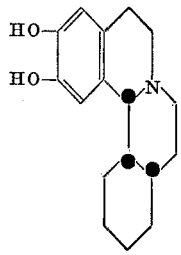

9. The process for the production of the free base of claim 1 which comprises heating 2-formylcyclohexaneacetic acid with 3,4-alkoxyphenethylamine in an acetic medium at reflux for about 1 to 2 hours to obtain an unsaturated lactam of the formula 1 followed by prolonged heating to obtain a mixture of lactams of the formulas:
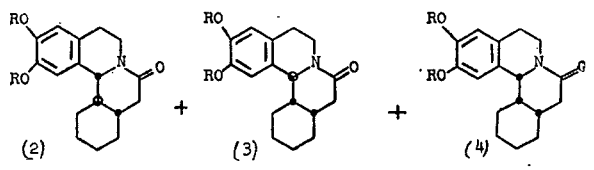
and reducing with an alkali metal hydride said lactams (2), (3) and (4).
References Cited
Anoka et al., Chem. Pharm. Bull., vol. 15, pp. 822–5 (1967).
D. G. DAUS, Primary Examiner
U.S. Cl. X.R.
260—286, 514, 570S; 424—258